(12) United States Patent
Kilburn (10) Patent No.: US 11,575,506 B2
(45) Date of Patent: Feb. 7, 2023

(54) SYSTEM AND METHOD FOR ELECTRONIC CONFERENCE VERIFICATION AND MANAGEMENT

(71) Applicant: Mitel Networks Corporation, Kanata (CA)

(72) Inventor: Michael Kilburn, Bastrop, TX (US)

(73) Assignee: Mitel Networks Corporation, Ottawa (CA)

( * ) Notice: Subject to any disclaimer, the term of this patent is extended or adjusted under 35 U.S.C. 154(b) by 308 days.

(21) Appl. No.: 16/730,402

(22) Filed: Dec. 30, 2019

(65) Prior Publication Data

US 2021/0203486 A1 Jul. 1, 2021

(51) Int. Cl.
| | | |
|---|---|---|
| H04L 9/08 | (2006.01) | |
| H04L 9/40 | (2022.01) | |
| H04L 67/146 | (2022.01) | |
| H04L 9/30 | (2006.01) | |
| H04L 12/18 | (2006.01) | |
| G06F 9/54 | (2006.01) | |

(52) U.S. Cl.
CPC ............ *H04L 9/0819* (2013.01); *G06F 9/547* (2013.01); *H04L 9/3073* (2013.01); *H04L 12/1813* (2013.01); *H04L 63/0428* (2013.01); *H04L 67/146* (2013.01)

(58) Field of Classification Search
None
See application file for complete search history.

(56) References Cited

U.S. PATENT DOCUMENTS

| | | | | |
|---|---|---|---|---|
| 2009/0228808 A1* | 9/2009 | MacDonald | ........... | G06Q 40/04 715/756 |
| 2012/0204032 A1* | 8/2012 | Wilkins | .............. | H04L 63/0428 713/170 |
| 2015/0141005 A1* | 5/2015 | Suryavanshi | ......... | H04W 48/16 455/434 |
| 2015/0180821 A1* | 6/2015 | Shapiro | ............... | H04L 12/1822 709/206 |
| 2018/0232705 A1* | 8/2018 | Baker | ................. | G06F 3/04817 |

* cited by examiner

*Primary Examiner* — Brandon Hoffman (57) ABSTRACT

Methods and systems for creating and managing electronic communications are disclosed. Exemplary methods can compress and encrypt meeting information and encode the compressed and encrypted meeting information into a uniform resource locator (URL) for transmission between one or more devices and a conferencing server.

18 Claims, 6 Drawing Sheets

SYSTEM AND METHOD FOR ELECTRONIC CONFERENCE VERIFICATION AND MANAGEMENT

FIELD OF THE INVENTION

The present disclosure generally relates to electronic communication methods and systems. More particularly, examples of the disclosure relate to electronic communication methods and systems suitable for conducting electronic meetings.

BACKGROUND OF THE DISCLOSURE

Network-based conference services often use participant credentials and other information to setup, initiate, and/or allow participants to organize, manage, and/or join an electronic communication, such as a (video and/or audio) conference call. Oftentimes, such information, e.g., user identification, credentials, meeting information, and the like, is stored on a communication server.

Meeting reservation information can be manually entered or can be created by an application, such as a calendar application, such as Outlook. The meeting reservation information can be copied to a database managed by a conferencing system when scheduled meetings (e.g., with special user permissions) are created or modified by users. A plugin application can be used to create a conference from the calendar application, copying the meeting information as part of the process of creating the meeting. The meeting information is then stored and managed on the communication server.

Meeting information that is stored on the communication server can be used to authenticate and for special permission enforcement for authenticated users. For example, organizers and presenters may have greater access and/or control of the conference. Meeting information can also include meeting times, participant names, participant titles, and the like. Managing this data in light of privacy laws, such as the European Union General Data Protection Regulation (GDPR) and other such laws and regulation, can be difficult. Further, data synchronization and garbage collection of meeting data may be of additional concern. Accordingly, improved methods and systems for organizing, initiating, and/or managing an electronic communication, such as a meeting, are desired.

Any discussion of problems provided in this section has been included in this disclosure solely for the purposes of providing a background for the present invention, and should not be taken as an admission that any or all of the discussion was known at the time the invention was made.

BRIEF DESCRIPTION OF THE DRAWING FIGURES

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present disclosure.

DETAILED DESCRIPTION OF EXEMPLARY EMBODIMENTS

The description of exemplary embodiments of the present disclosure provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

As set forth in more detail below, exemplary embodiments of the disclosure relate to electronic communication systems that can use a microservice located in the cloud to initiate and manage a meeting, while mitigating risk of disclosure of personal or confidential information. Exemplary systems and methods can, for example, compress and encrypt meeting information and encode the compressed and encrypted meeting information into uniform resource locator (URL) information (sometimes referred to herein simply as URL) for transmission between one or more devices and a conferencing server (microservice). The URL can additionally include prepended and/or appended information. Use of methods and systems described herein allow for relatively easy, cloud-based setup and management of meetings, including authentication of participants, without maintaining the meeting information on the conferencing server.

Figure 1:
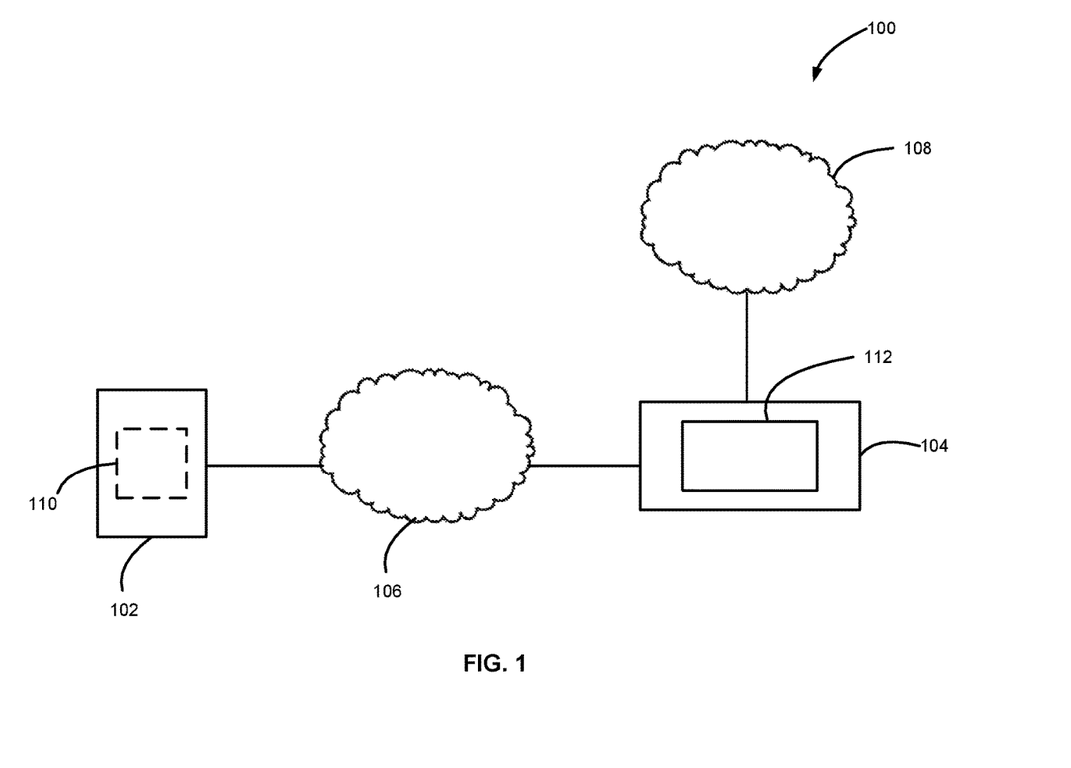
FIG. 1 illustrates an electronic communication system in accordance with exemplary embodiments of the disclosure.

Turning now to the figures, FIG. 1 illustrates an electronic communication system 100 in accordance with exemplary embodiments of the disclosure. For illustration purposes, system 100 is described in the context of creating and/or managing conferences or meetings using a cloud-based system. However, unless otherwise noted, systems and methods in accordance with embodiments of the disclosure are not so limited. For example, the systems and methods described herein could also be used for sharing data or communicating information with specific users or groups of users in a secure manner without the need for storing data in a database.

Electronic communication system 100 includes one or more participant devices, such as device 102, a conferencing system 104, and a network 106. Electronic communication system 100 can also include another network 108 coupled to conferencing system 104.

Device 102 can be or include any suitable device with wired or wireless communication features and that can connect to network 106. For example, device 102 can include a wearable device, a tablet computer, a wired phone, a mobile phone, a personal (e.g., laptop or desktop) computer, a streaming device, such as a game console or other media streaming device, or the like. One or more of devices 102 can include an application or client 110 to perform various functions set forth herein and/or to cause to be displayed text and/or other information as described herein. By way of example, an application or client can include a calendaring function to facilitate scheduling and managing electronic communications, such as meetings (also referred to herein as conferences). As set forth in more detail below, an application programming interface (API) can be used to (e.g., securely) pass information from device 102 to conferencing system 104.

Conferencing system 104 can include a conferencing server 112. Conferencing system 104 and conferencing server 112 can perform various (e.g., microservice) functions as described herein. For example, conferencing system 104 (e.g., conferencing server 112) can receive meeting information from client 110. Conferencing server 112 can then encrypt the meeting information (as received or in an altered—e.g., compressed form) and encode the encrypted meeting information into meeting uniform resource locator (URL). The URL can be stored by meeting participant devices—e.g., in a meeting invitation, rather than in the cloud/on conferencing server 112. When a meeting is joined, the conferencing server 112 can decode, decrypt and optionally decompress the meeting data/information and conference parameters for starting and managing a conference. In addition to added security, methods and systems described herein can reduce an amount of data maintained on conferencing server 112, which is an added benefit of exemplary embodiments of the disclosure.

Network 106 can include or be, for example, an internet protocol (IP) network. Exemplary types of networks suitable for communication with network 106 can be or include a local area network, a wide-area network, a metropolitan area network, one or more wireless networks, a private branch exchange (PBX), or a portion of the Internet. Various components of network 106 can be coupled to one or more other components using an Ethernet connection, other wired connections, and/or wireless interfaces. Network 106 can be coupled to other networks and/or to other devices typically coupled to networks. By way of particular example, network 106 includes a communication network and network 106 can be coupled to additional networks that can be coupled to one or more devices, such as device 102.

Network 108 can include another network, such as a network similar to network 106. By way of example, network 108 can be or form part of a public switched telephone network (PSTN).

Figure 2:
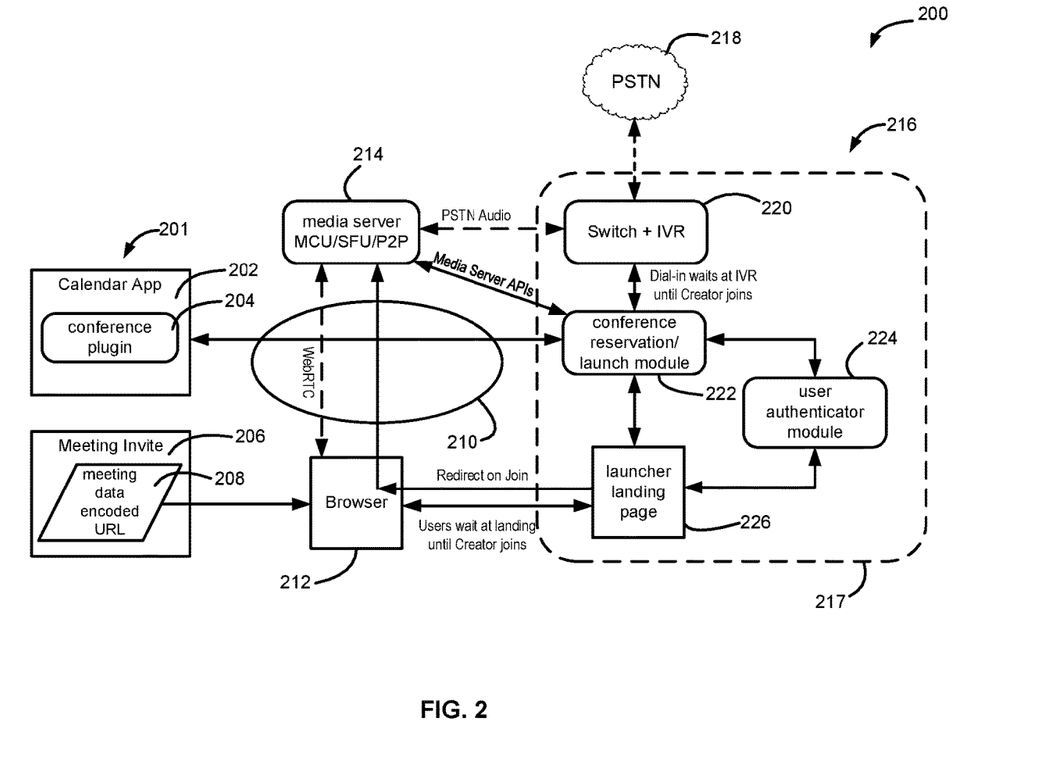
FIG. 2 illustrates a portion of an electronic communication system in accordance with exemplary embodiments of the disclosure in greater detail.

FIG. 2 illustrates an electronic communication system 200 in accordance with further examples of the disclosure. Electronic communication system 200 can be the same or similar to electronic communication system 100.

In the illustrated example, electronic communication system 200 include a calendar application 202 (e.g., as part of or separate from a client, such as client 110), a network 210, and a conferencing system 216. Client 110 and calendaring application 202 can be used by the same or different devices.

Network 210 can be the same or similar to network 106. By way of example, network 210 can be or form part of the Internet.

Conferencing system 216 includes one or more conferencing servers, such as conferencing server 217, to perform various functions described herein. In the illustrated example, conferencing server 217 includes a switch+IVR module 220, a conference reservation/launch module 222, a user authentication module 224, and a launcher landing page 226. Although separately illustrated, two or more of switch+IVR module 220, conference reservation/launch module 222, user authentication module 224, and launcher landing page 226 can be combined, in any combination, and/or various functions of one or more of switch+(optional) interactive voice response (IVR) module 220, conference reservation/launch module 222, user authentication module 224, and launcher landing page 226 can be separated into one or more additional modules and or servers.

As used herein, "module" can refer to computer program instructions, encoded on computer storage medium for execution by, or to control the operation of, data processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., solid-state memory that forms part of a device, disks, or other storage devices).

Switch+IVR module 220 can be used to can be used to control call flows to and from conferencing system 216 and conferencing server 217. When used, an IVR component of module 220 can be used allow callers to interact with conferencing system 216 via their telephone keypads and/or voice commands.

Conference reservation/launch module 222 can be used to launch a conference once requite conditions have been met. For example, conference reservation/launch module 222 can wait until a meeting leader or creator joins a conference and/or until requisite authentication is verified before launching a meeting. In addition, conference reservation/launch module 222 can (optionally) compress, encrypt, and encode information into a URL, as described in more detail below. This allows electronic communication system 200 to operate without maintaining meeting information on communication server 217 for a period of time—e.g., after the a URL for a meeting is created. Although conference reservation/launch module 222 is described herein as performing a plurality of functions, one or more of these functions can suitably be performed by one or more other modules of communication server 217 or in communication with communication server 217.

User authentication module 224 can be used to verify one or more participants. For example, user authentication module 224 can be used to verify a meeting creator and/or leader. Further, user authentication module 224 can be used to verify credential for access to various files that may be used or transmitted during a conference.

Launcher landing page 226 can be used to provide a landing page for a conference corresponding to the URL transmitted by conference reservation/launch module 222.

Figure 3:
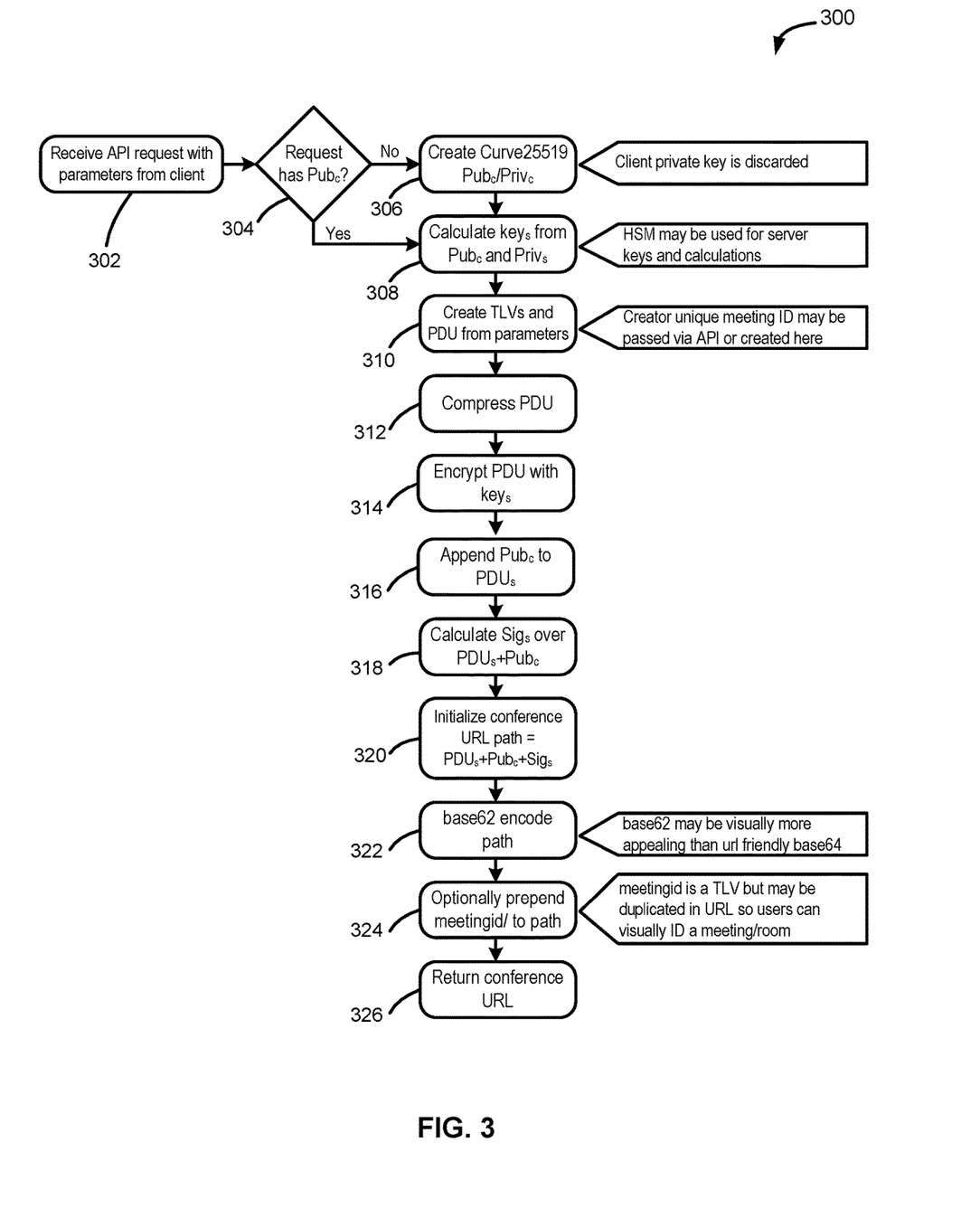
FIG. 3 illustrates a method in accordance with exemplary embodiments of the disclosure.
Figure 4A:
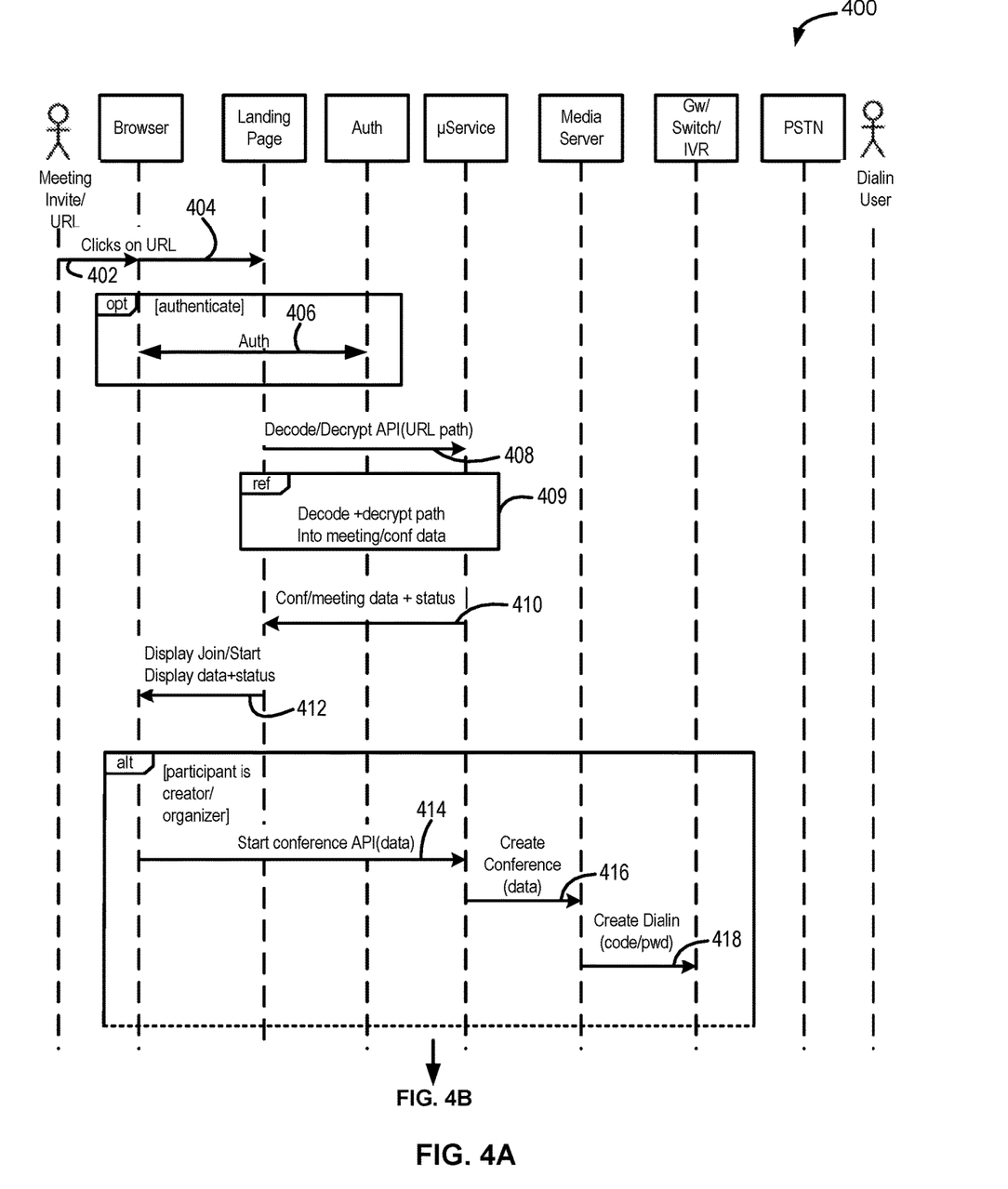
FIGS. 4A and 4B illustrate a sequence diagram in accordance with additional exemplary embodiments of the disclosure.
Figure 4B:
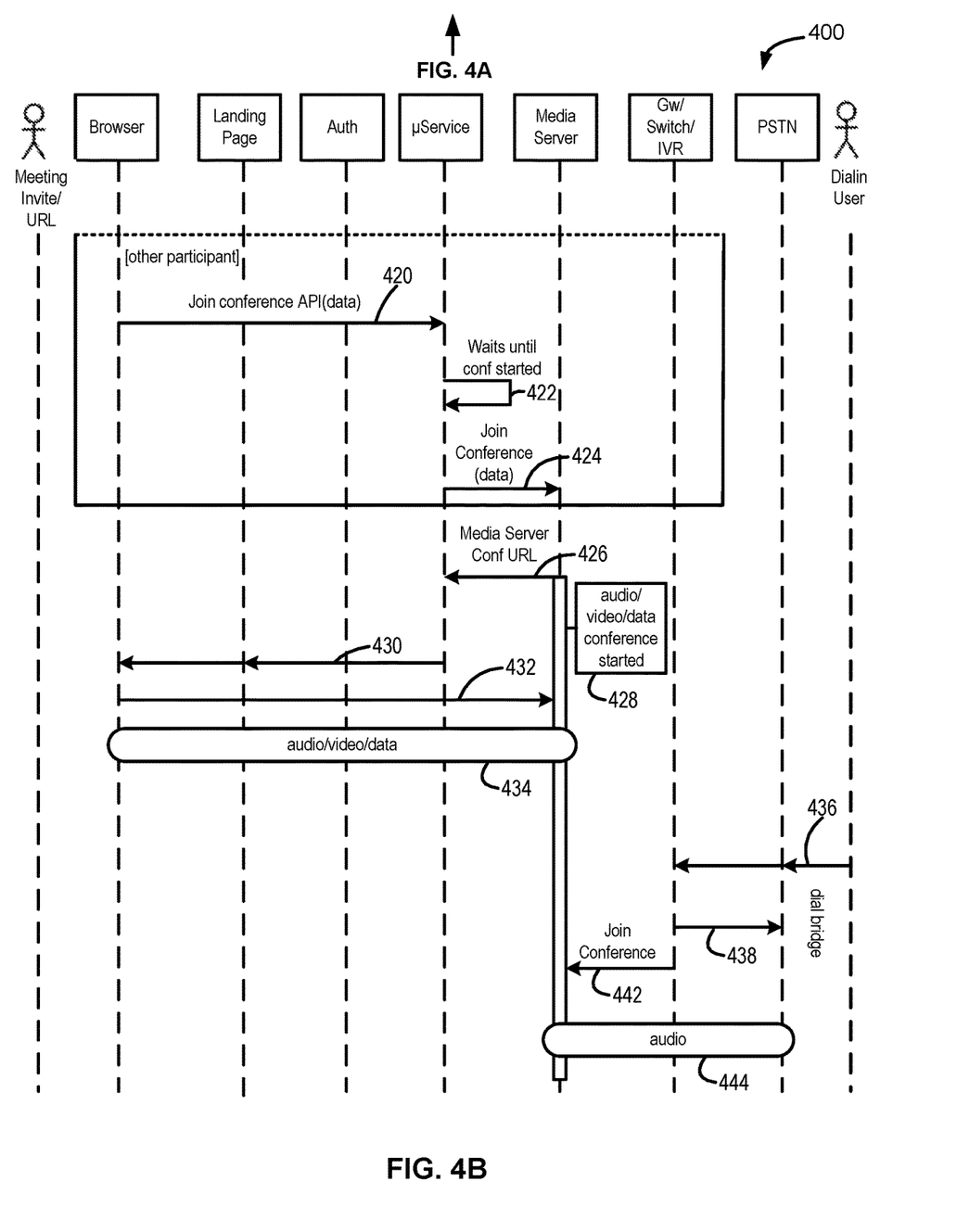
Figure 5:
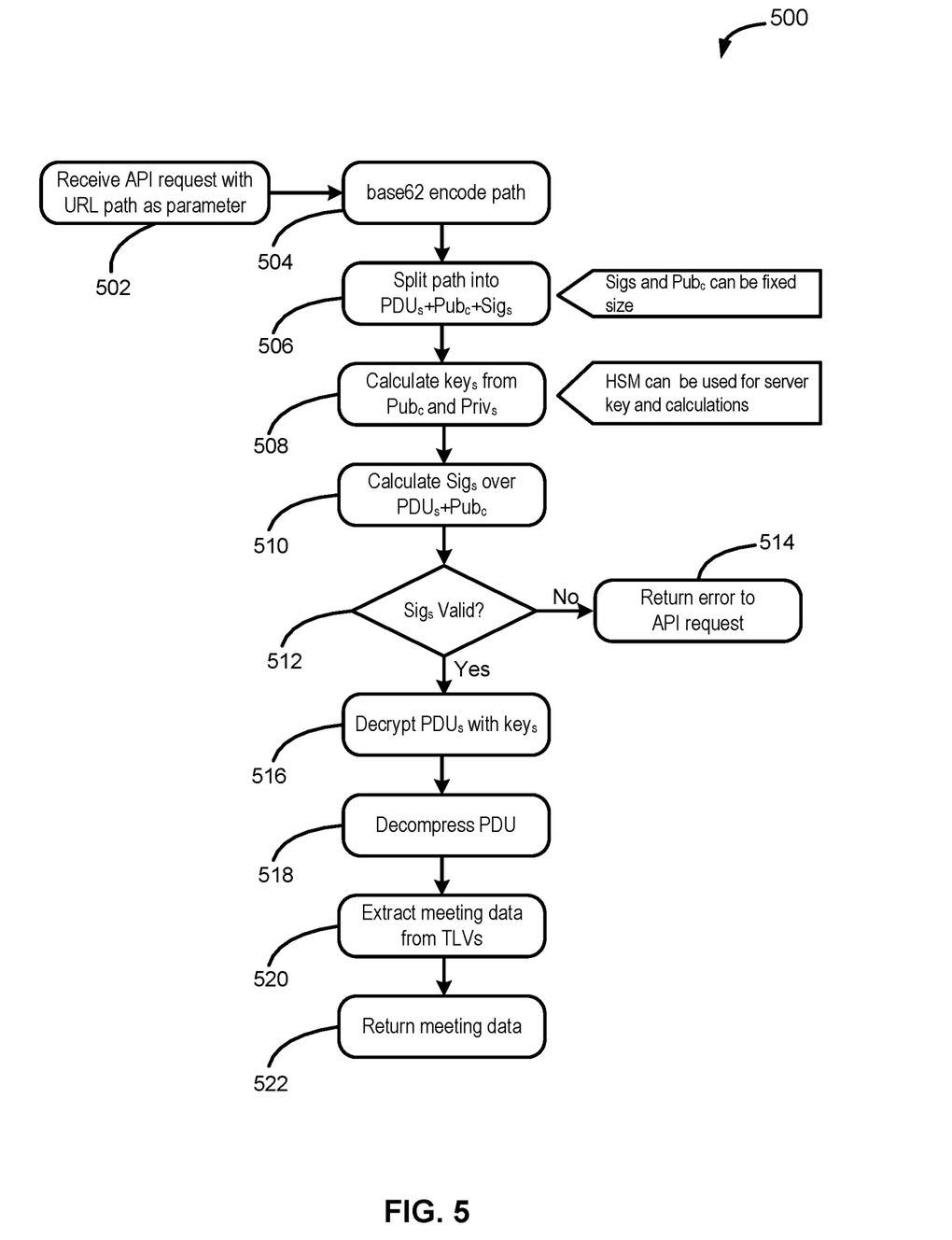
FIG. 5 illustrates another method in accordance with further exemplary embodiments of the disclosure.

Exemplary operations of electronic communication systems 100 and 200 are illustrated in connection with FIGS. 3-5. FIG. 3 illustrates a method 300 for (optionally) compressing, encrypting meeting information, and encoding information in accordance with examples of the disclosure. FIGS. 4A and 4B illustrate a sequence diagram for (optionally) compressing, encrypting meeting information, and encoding information in accordance with further examples of the disclosure. FIG. 5 illustrates a method of joining a meeting in accordance with examples of the disclosure.

Method 300 can be performed using a conferencing server, such as conferencing server 217, which can provide a microservice as described herein. Method 300 includes a step of receiving a (e.g., an API) request with parameters from a client, such as client 110 (e.g., including calendar application 202) via a conference plugin 204 (step 302).

In accordance with examples of the disclosure, each client can create its own public and private keys. The client-specific public and private keys pair does not need to be stored or remembered by the client, unless a participant using the client would like to later decrypt the conference URL (e.g., for diagnostic or informational purposes). In this case the client could protect its private key using a password based (e.g., a key derivation function (KDF) password) in local storage or the local operating system secure storage/keychain; in this case, a microservice (e.g., a conferencing server) can expose its public key. Where and when the creating client key pair is generated can depend on a desire to allow a creating client to decrypt conference URLs (created in the past). In at least some cases, under no conditions can any client decrypt another clients URL. If there is no desire to allow the client to decrypt said client's URL, then the $Pub_c/Priv_c$ can be generated by the microservice on demand and then discarded after the URL is created. This may be a preferred mode of operation.

Calendar application 202 or a browser can also be used to update meeting information by, for example, after the authentication is completed using an API (URL), pushing the updated meeting information to a microservice (e.g., via a landing page), which in turn incorporates the updated meeting information and send an updated URL back to the application appropriately updated with the recent information. In accordance with examples of the disclosure, a plugin interface that can hook into the meeting creation/update process can be use, so when a user (e.g., of Outlook or another calendar application) creates/updates a meeting, the plugin application gets temporary control of and can use the meeting information to contact the microservice to create the encrypted URL and then add the returned URL to a meeting invitation. The plugin can also display its own conference parameters in the meeting creation/update UI. Mitel's Outlook Conferencing plugin is an example of this kind of application.

At step 304, a determination is made whether the request from step 302 includes a public key, $Pub_c$, which can be unique to the client and/or to a request. Methods described herein are described in connection with a using a Curve25519 Diffie-Hellman based encryption system. However, unless otherwise noted, the disclosure is not limited to use of such encryption techniques.

The microservice can use a key pair including a public server key, $Pub_s$, and a private server key, $Priv_s$. This key pair can be stored on a conferencing server or associated hardware security module (HSM). Each client can include a unique public/private (e.g., Curve25519) key pair ($Pub_c$, $Priv_c$).

If the request from step 302 did not include $Pub_c$, then method 300 proceeds to step 306 of creating a $Pub_c$ and a corresponding private key, $Priv_s$. At this stage, if a client private key was included in the request from step 302, the client private key can be discarded. If the request from step 302 did include $Pub_c$ or once step 306 is completed, method 300 proceeds to step 308.

At step 308, a symmetrical key, $Key_s$ can be derived from $Priv_s$ and $Pub_c$ by the microservice (e.g., server 217). If desired, a HSM can be used to manage one or more keys and/or to calculate one or more keys described herein.

At step 310 type, length, value fields (TLVs) protocol data units ($PDU_s$) are created using the microservice/server 217 (e.g., module 222). Exemplary TLVs include the following. The list below is illustrative and, unless noted otherwise, is not meant to limit the scope of the disclosure.

Meeting/Room ID. The meeting/Room ID can include an identifier or name for a conference All participants in a particular conference can have their communication channels (audio, video, chat) connected to each other by, e.g., one or more of peer-to peer (P2P), selective forwarding unit (SFU), multipoint control unit (MCU), or the like.

Meeting title. The meeting title can be derived from, for example, a calendar invitation.

Meeting start time, end time, recursion, expiration time. Such scheduling information can be received from the calendar invite—e.g., from client 201 and/or calendar application 202.

Authenticated participant permissions. The authenticated participant permissions can include special permissions assigned to a particular authenticated user (e.g., a creator, organizer, presenter, or the like). Authenticated users can be redirected to an authentication portal prior to joining a conference.

External participant. This TLV can identify an unauthenticated invited attendee (email address/name).

Participant/leader passwords: Passwords that allow users to join or control the conference.

Miscellaneous conference parameters: Options for the conferencing server, for example play a tone when a user joins the conference.

Meeting agenda.

Document links.

Meeting globally unique identifier (GUID) from creator calendar app. This could be used to retrieve an Exchange meeting (creator could be redirected to an Exchange OAuth2 portal then data could be retrieved).

The PDUs can be created by PDUs can be created by a microservice (e.g., server 217) from the parameters passed in thane API request.

At step 312, the PDU information is optionally compressed. Any suitable compression algorithm can be used during step 312. By way of example, the DEFLATE algorithm for forming zip files can be used.

At step 314, the PDU information is encrypted using (e.g., symmetrical) $Key_s$ (e.g., calculated using calculated from $Pub_c$ and $Priv_s$ by the Curve25519 Diffie-Hellman function) to form $PDU_s$, which includes compressed and encrypted TLVs. If needed a client can calculate this same key from Pubs and Privc. During step 316, $Pub_c$ can be appended to $PDU_s$.

At step 318, a signature, $Sig_s$, can be calculated. For example, $Sig_s$ can be created using the PDU and server private key ($Priv_s$) using an Edwards-curve Digital Signature Algorithm (EdDSA) Ed25519 algorithm. $Sig_s$ can be verified using the PDU and server public key ($Pub_s$) using the Ed25519 algorithm. Ed25519 is a special case of a Edwards-curve Digital Signature Algorithm EdDSA signature.

At step 320, a conference URL path information is determined based on $PDU_s$, $Pub_c$, and $Sig_s$. Exemplary patch formats are provided below.

During step 322, the URL information is encoded. The URL information can be encoded using, for example, base 62 or base 64 encoding. Base 62 encoding may be more visually appealing to participants.

At step 324, information can be prepended and/or appended to the encoded URL. For example, $Pub_c$ can appended to the encoded URL, so a microservice can later decrypt the meeting data. Additionally or alternatively, a message authentication code, $Sig_s$, can be appended to the encoded URL. Additionally or alternatively, a microservice can prepend the meeting identification (which may also be included in the TLV) as an unencrypted path directory. This can help a participant recognize a specific conference when used outside of a meeting invitation. The URL format can be, for example: https://reservation.server/encrypted-path or https://reservation.server/meetingid/encrypted-path. By way of example, the encrypted-path can be: base62 encoded concatenation of $|PDU_s|PUb_c|Sig_s|$.

During step 326, the encrypted URL and optionally unencrypted prepended and/or appended information is returned to the client.

Turning now to FIGS. 4A and 4B, method 400 is illustrated, in connection with electronic communication system 200. Method 400 can be used to join a meeting once a participant client receives a URL 208—e.g., in a meeting invitation 206. Steps 402-412 can be used to authenticate a participant and join the authenticated participant's client to a meeting. This method can begin with a participant selecting URL 208 (e.g., a URL created using method 300) (step 402). Once the URL is selected, the participant is directed to a browser (e.g., browser 212), which transmits information to a landing page launcher (e.g., landing page launcher 226); the landing page launcher can return information to cause a display a landing page for the conference (step 404) on a device including the client. Browsers can generally support very large URLs (e.g., 64 k characters or more); if desired, an external/unauthenticated attendee list can be truncated.

During step 406, a participant can be authenticated—e.g., using user authentication module 224. Authentication can be performed by, for example, directing authenticated participants to an authentication portal. Exemplary authentication techniques include https with authentication access. Authentication during step 406 can be used to allow a participant to manage the conference, to manage information associated with the conference, or the like. For example, authentication can be used to allow a participant perform meeting functions, such as muting/unmuting participants, kicking a participant out of the meeting, starting/stopping recording of the meeting or portions thereof, sharing data like a screen or document, ending the conference, etc.

During step 408 and 409, encrypted URL information is sent to a microservice to be decoded and decrypted into meeting information. FIG. 5, discussed below, illustrates an exemplary method for decoding and decrypting the URL information. Confirmation information can be sent from the microservice to the landing page during step 410. During step 412, meeting start and/or join information can be sent from the landing page and displayed on the browser. Starting the conference dynamically can create the meetingid/room on media server 214. If a conference has not been started, then it effectively does not exist. Because, in some cases, a conference may not exist until the creator/organizer/authenticated participant starts the conference, there is no need to delete or otherwise invalidate a conference URL. An organizer can simply not use or stop using the URL.

Steps 414-418 illustrate alternative steps that a meeting creator or organizer can take to create conference joining information. During step 414, a participant can start a process to join a conference by sending API data (e.g., from a participant client) through a browser and to the microservice. The microservice can then create conference data and send the conference data to a media server, such as media server 214. The media server can then send dial-in information, such as a code and/or password to a switch and IVR, such as switch and IVR 220.

Steps 420-424 illustrate steps for other participants, such as non-authenticated participants (e.g., non-creators or non-organizers), to join a conference. During step 420, a participant can start a process to join a conference by sending API data (e.g., from a participant client) through a browser and to the microservice. The microservice then waits to start the meeting until a designated participant, such as an authenticate participant, a creator, organizer, or the like, joins the conference (step 422). Once the designated participant has joined the meeting, the microservice sends information to the media server and other participant(s) can also join the meeting (step 424).

Once a meeting has started (e.g., at steps 412, 424), video and/or audio information streaming can begin (steps 426 and 428). During step 426, a media server conference URL is sent from the media server to the microservice. The microservice can then send information to the browser (step 430) and the browser can send information to the media server (Step 432). The browser can get redirected to the media server by the landing page, which gets the redirect URL from the microservice. A live conferencing application can be loaded into the browser at the media server. This is just an example; the conferencing application could load from the landing page, but in any case, the conferencing application (running in the browser) would know where the media server is, so the webrtc signaling (from the browser) can be sent there. The conference media/signaling itself does not pass through the microservice. During step 434, audio and/or video information can be shared between participants during the meeting.

Steps 436-442 illustrate steps for participants to join a conference by dialing in over a PSTN. During step 436, a participant can dial in to a switch and IVR (e.g., switch and IVR 220). The switch and IVR can receive information from a participant device, such as a meeting identifier and/or passcode, during step 436. The participant can be authenticated during step 438, and join the conference during step 442. Once the participant joins the conference, audio information can be shared during step 444.

Turning now to FIG. 5, a method 500 of decoding and decrypting encoded and encrypted URL information is illustrated. In the illustrated example, method 500 begins by receiving (e.g., at a server, such as server 217) a (e.g., API) request to join or create a meeting with an URL path as a parameter (step 502). At step 504, an encoded path is detected—e.g., using a conference/reservation launch module of a microservice. During step 506, the URL information can be split into compressed and encrypted information (e.g., TLVs), $PDU_s$; client public key, $Pub_c$; and a server signature, $Sig_s$. $Sig_s$ and $Pub_c$ can be fixed in size. At step 508, a symmetrical key, $Key_s$, is derived using the microservice from the server/microservice private key, $Priv_s$, and the client public key, $Pub_c$. During this step, an HSM can be used to determine the respective keys.

At step 510, a server signature, $Sig_s$, can be determined from compressed and encrypted information, $PDU_s$, and client public key, $Pub_c$. At step 512, a determination is made whether the server signature is valid. If the server signature is not valid, an error message is returned (step 514). If the server signature is valid, method 500 proceeds to step 516. At step 516, the microservice decrypts compressed and encrypted information, $PDU_s$ using $Key_s$. The decrypted information can then be optionally decompressed using the microservice, using, for example, the DEFLATE algorithm, discussed above. The microservice can then extract meeting information from the TLVs in the decrypted and optionally decompressed information (step 520). Finally, in step 522, the meeting information can be sent to the participant client—e.g., via a browser, such as browser 212 and/or to a media server, such as media server 214.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. The features of the various embodiments may stand alone or be combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. For example, although much of the disclosure relates to a cloud service, peer-to-peer systems could alternatively be used. These and other changes or modifications are intended to be included within the scope of the present invention, as expressed in the following claims.

The invention claimed is:

1. An electronic communication system comprising:
   a conferencing system comprising a conferencing server; and
   a participant device comprising a client and coupled to the conferencing system via a network;
   wherein the conferencing system receives meeting information from the client, wherein the meeting information comprises one or more of special user permissions, participants, meeting start time and date, meeting end time and date, conference parameters, meeting title, and recurrence, and
   wherein the conferencing server compresses, encrypts, and encodes the meeting information into a meeting uniform resource locator (URL);
   wherein the conferencing server transmits the meeting URL to the participant device and deletes the meeting information after the meeting URL is created.

2. The electronic communication system of claim 1, wherein the meeting URL is stored on the participant device.

3. The electronic communication system of claim 1, wherein the meeting information is transmitted via a secure application programming interface (API) from the participant device to the conferencing system.

4. The electronic communication system of claim 1, wherein the meeting URL is encoded using a private key and a public key.

5. The electronic communication system of claim 1, wherein the conferencing server stores a public key and private key pair for encryption of the meeting information.

6. The electronic communication system of claim 1, wherein a unique public/private key pair is associated with the client.

7. The electronic communication system of claim 6, wherein the client does not store the unique public/private key pair.

8. The electronic communication system of claim 6, wherein the client stores the unique public/private key pair.

9. The electronic communication system of claim 1 that further comprises a calendar application or browser configured to update the meeting information and send an updated meeting URL.

10. A cloud-based conferencing system comprising:
    a conferencing server comprising a secure application programming interface (API),
    wherein the conferencing server encrypts meeting information received by the API, wherein the meeting information comprises one or more of special user permissions, participants, meeting start time and date, meeting end time and date, conference parameters, meeting title, and recurrence,
    wherein the conferencing server compresses, encodes, and encrypts the meeting-information into a meeting uniform resource locator (URL),
    wherein the conferencing server causes transmission of the meeting URL to another device, and
    wherein the conferencing server does not maintain the meeting information after the meeting URL is created.

11. The conferencing system of claim 10, wherein the conferencing system generates a public key and a private key for encryption of the meeting information.

12. The conferencing system of claim 11, wherein the public key and the private key are discarded once the URL is created.

13. The conferencing system of claim 10, wherein the conferencing server prepends an unencrypted meeting identifier on the URL.

14. An electronic communication method comprising the steps of:
    using a client on a participant device, sending meeting information to a conferencing server, wherein the meeting information comprises one or more of special user permissions, participants, meeting start time and date, meeting end time and date, conference parameters, meeting title, and recurrence;
    using the conferencing server, compressing, encrypting, and encoding the meeting information into a meeting uniform resource locator (URL) and deleting the meeting information from the conference server after the meeting URL is created; and
    transmitting by the conferencing server the meeting URL to the client.

15. The method of claim 14, further comprising a step of sending the meeting URL to a plurality of clients.

16. The method of claim 14, wherein the meeting information is encrypted using a private key and a public key.

17. The method of claim 14, wherein the meeting URL comprises public key information.

18. The method of claim 14, wherein the meeting URL comprises an appended signature.

* * * * *